2 Sheets—Sheet 1.

A. BURGESS.

MAGAZINE FIRE ARM.

No. 10,555. Reissued Feb. 3, 1885.

WITNESSES:

Morris A. Clark.

W. Ofterarus

INVENTOR.

Andrew Burgess

N. PETERS, Photo-Lithographer, Washington, D. C.

A. BURGESS.

MAGAZINE FIRE ARM.

No. 10,555. Reissued Feb. 3, 1885.

WITNESSES:
Morris A. Clark.
W. Ostrander

INVENTOR:
Andrew Burgess

N. PETERS, Photo-Lithographer, Washington, D. C.

UNITED STATES PATENT OFFICE.

ANDREW BURGESS, OF OWEGO, NEW YORK.

MAGAZINE FIRE-ARM.

SPECIFICATION forming part of Reissued Letters Patent No. 10,555, dated February 3, 1885.

Original No. 290,529, dated December 18, 1883. Application for reissue filed November 21, 1884.

*To all whom it may concern:*

Be it known that I, ANDREW BURGESS, of Owego, in the county of Tioga and State of New York, have invented certain new and useful Improvements in Magazine Fire-Arms; and I do hereby declare the following is a full, clear, and exact description of the invention, such as will enable others skilled in the art to which it appertains to make and use the same, reference being had to the accompanying drawings, and to the letters of reference marked thereon, which form a part of this specification.

This invention relates to magazine or breech-loading fire-arms; and it consists in the modifications of the reciprocating breech and locking device, together with other combinations of magazines and parts, hereinafter more fully set forth and described.

Similar letters of reference indicate corresponding parts.

Figure 1:
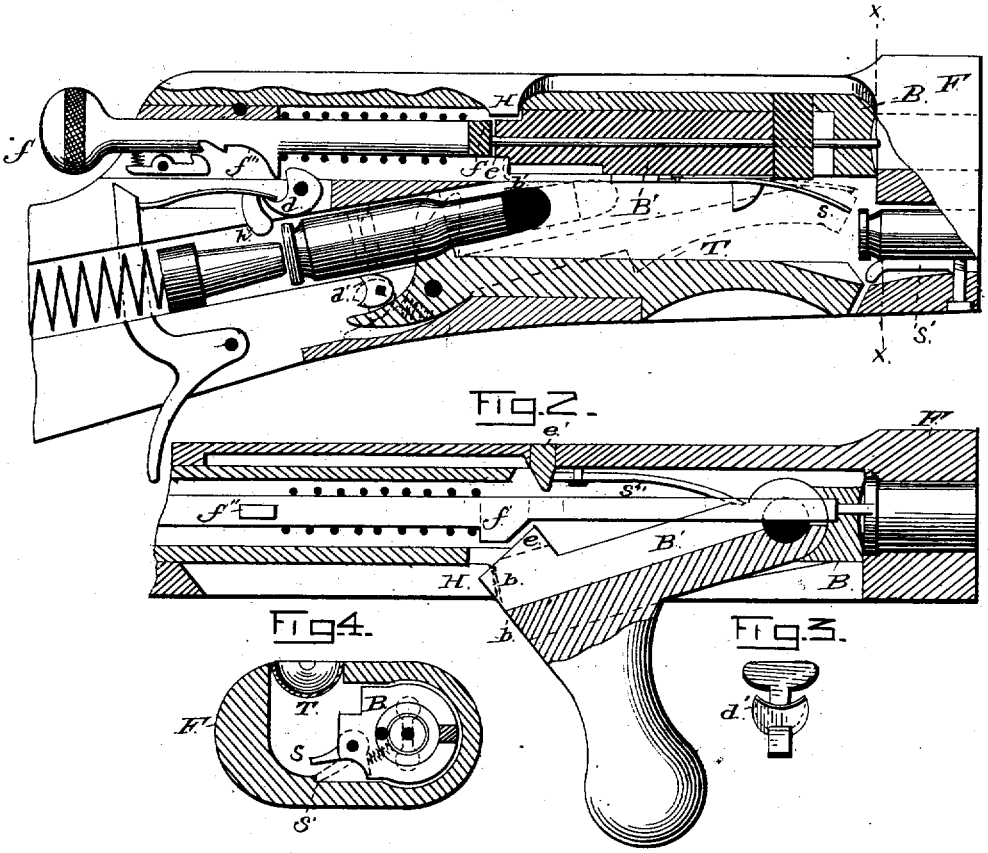
Figure 5:
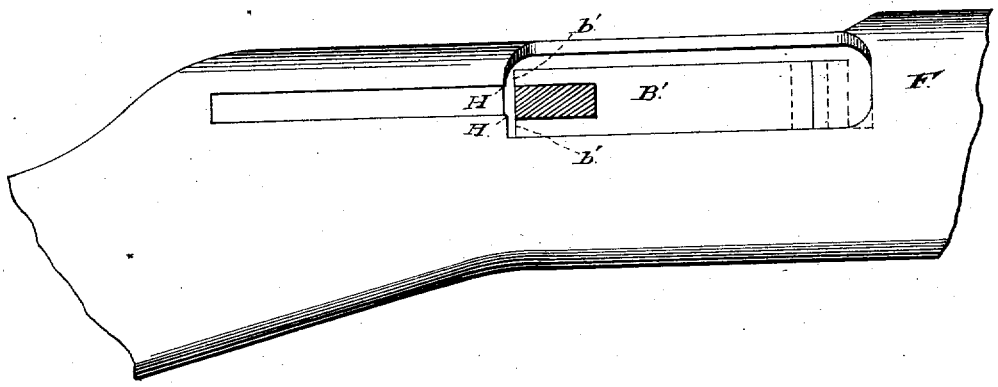
Figure 6:
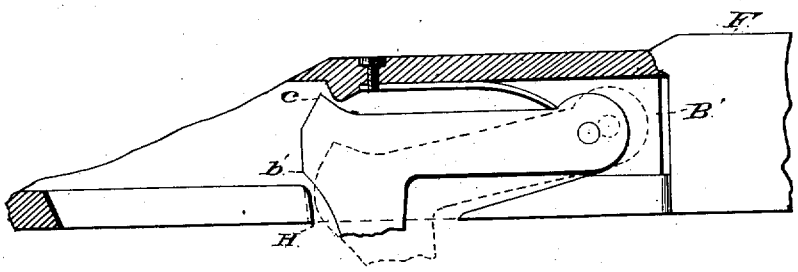

Figure 1 represents a sectional side elevation of the arm. Fig. 2 is a sectional plan view from the top; Fig. 3, the magazine and carrier-stop detached; and Fig. 4, a section through the frame, showing the face of the breech-bolt and modification of loading device, the arm being turned on its side in position for loading. Fig. 5 represents a side elevation of a portion of this arm, showing the locking-shoulders H H and the slot extending back from between them. Fig. 6 is a plan view, partly sectioned, showing the top of the locking-brace and its shoulders $b'$ $b'$ in the unlocked position, and in dotted lines the position brace B′ takes as it locks the breech and cams forward the bolt.

F is the frame of the arm; B, the breech piece or bolt; B′, the locking-block; $f$, the firing-bolt, and T the loading trap or gate. This gate, as shown in Fig. 1, also serves as a carrier. A hollow bolt, B, is fitted to reciprocate in the frame F. A swinging block, B′, hollowed to receive the firing-pin, having a handle by which to move the bolt, is fitted into said bolt and pivoted near its forward end, and said block B′ has a locking-shoulder, $b$, to engage corresponding locking-shoulders, H H, in the frame. It has also an inclined part, $b'$, at its rear, near its handle, and a double-inclined projection, $e$, opposite. The firing-pin, having the usual spiral spring, is provided with projections $f'$ and $f''$, and the ejecting-stud $e'$ is inclined at its rear, as shown in Fig. 2. This arm, as shown in Fig. 1, is provided with two magazines—one under the barrel, and one in the rear—but either or both can be omitted without material change in the bolt system above described. The rear magazine is provided with a detent, $d$, which is turned to engage and stop the cartridge by a spring, said spring being controlled by a projecting stud, $p$, to prevent said detent from engaging the forward part of the cartridge. This detent is turned back to disengage and release the cartridge by the projection $f''$ of the firing-pin. The double cam-stop $d'$ locks the cartridges to hold them firmly in the magazine, as shown in Fig. 1, or releases them when turned back, as shown in dotted lines in same figure, and then also locks the carrier up to position, also shown by dotted lines.

The bolt B is provided with a spring, S, to prevent the cartridge in the forward magazine from entering upon the carrier until the breech is drawn open. A modification of said spring S is shown as a spring-stud in Fig. 4, and a depression is made in the frame at S′ to permit said stud S to be depressed by the gate or trap T, which is here placed on the side of the arm. The spring stud or stop merely serves to hold the cartridges forward in the magazine when the trap is in its outer or normal position.

In operating this arm, to charge the forward magazine, press in the trap T until it compresses the spring S so far as to admit the cartridges, when said spring will prevent their return. Charge rear magazine by forcing the cartridge back of detent $d$ when the breech is open, the carrier being held upward by stop $d'$, as shown in dotted lines, Fig. 1. A cartridge may then be placed in the barrel, the breech closed, and the cartridge fired in the usual manner; but when the firing-pin strikes forward its projection $f''$ strikes the top of detent $d$, turning it to release a cartridge in the rear magazine, which will spring forward against the bottom of the bolt, as shown in dotted lines in Fig. 1, so that when the breech is again opened the impetus given by the next cartridge or the follower will throw it forward up the incline formed by the raised carrier into the barrel, or so far that the closing of the breech-bolt will drive it "home;" or, to use the charges from the forward magazine, turn the stop $d'$, which will allow the carrier to fall, and the upper arm of said stop will grasp and hold the cartridge of the rear magazine so it cannot feed forward. Then as the breech-bolt is drawn back the cartridge of the forward magazine will follow it back against the spring S or against the bolt until the breech is opened so far that the carrier will be raised by a stud on the bolt and raise the cartridge to a position for entering the chamber.

In Fig. 2 the bolt is shown locked by its locking-block B'. This is effected by the straightforward movement of pushing forward the bolt by the handle of the block B', whose inclined portion *b*. reaching outward against the shoulders H H in the frame, carries the bolt forward (the force of pushing on the block B outside of axis giving said block a tendency to swing outward) and forces the bolt to a fully-closed position as the shoulders *b* of said block engage the shoulders H H of the frame.

The breech is opened by simply pulling back on the handle of block B'. The effect of force thus applied obliquely to the line of movement of the bolt is to swing said block inward, and as its shoulder *b* leaves the shoulder H of the frame, unlocking the bolt, the projection *e* cocks the firing-pin by bearing against projection $f'$ of said pin, and the forward part of projection *e* striking the inclined rear of ejecting-stud $e'$, said stud serves as a cam to start the breech back, and in the backward movement of the bolt the base of the handle passes through a slot in the right side of the frame, and a groove in the opposite side of frame admits the projection *e*.

The bolt B may be made square or round. When made round, I prefer to also round the inner part of block B' and form its front end hemispherically, making a kind of ball-and-socket joint, but pivoted to the bolt to make said joint. The center of the bolt is first drilled out and finished where joint is to be by the round end of drill or reamer.

It is obvious that the block B' may swing downward, the handle projecting from the bottom of arm lock at the bottom instead of placing the locking-shoulders in the side of the frame, by a mere change of the location of the parts.

Having thus described my invention, what I claim as new, and desire to secure by Letters Patent, is—

1. The combination of a tubular magazine in the rear stock, a cartridge-detent pivoted in proximity thereto and having movement into said magazine as described, and a firing-pin in the breech mechanism having a projection as described, which projection in its movement engages with and operates said detent, substantially as set forth.

2. A reciprocating breech-bolt, and a locking-brace pivoted to said bolt within the frame of the gun, said brace being provided with a lateral projection by which operative force is applied to the brace substantially as specified, said brace having an incline on its rear which locks against a fixed shoulder in the frame, all combined substantially as stated, so that the forward and outward movement of the locking-brace by forward pressure on its projection, as aforesaid, presses the bolt forward with a cam or wedge action to force it home and lock it.

3. In combination, a reciprocating breech-bolt carrying a firing-pin, a locking-brace having its bearing in said bolt, an incline on the brace, and an inclined locking-abutment in the frame, and a handle connected to said locking-brace and extending outside the line of movement of the bolt, whereby said brace is moved to force the bolt home by the outward locking movement of the brace against the inclined locking-shoulder in the frame, substantially as described.

4. A reciprocating breech-bolt, a locking-brace pivoted to said bolt, so as to move therewith and to lock the bolt by direct engagement with an abutment in the frame, an incline on said locking-brace, and a firing-pin carried by the bolt, having an incline thereon in the line of movement of the incline on the locking-brace, so as to be moved back thereby, all the recited elements in combination, substantially as stated.

5. A hollow breech-bolt, a hollow locking-brace pivoted within the recess of said bolt, so that the locking portion may swing entirely into said recess, and a firing-pin in the bolt passing through the recess in the brace, all combined substantially as described.

6. In combination, in the frame of a breech-loading gun, a fixed locking-shoulder, a reciprocating bolt, a locking-brace (having an operating-handle connected therewith) hung to said bolt and swinging in its unlocking movement toward the axis of the bolt, a projection or incline, as *e*, on the locking-brace, and an incline or projection, as $e'$, on the frame, whereby the swinging movement of the brace in unlocking brings the projections into engagement and cams the bolt backward, substantially as described.

7. In a magazine-gun, a reciprocating breech-piece and a spring magazine-stop below the breech-piece, in combination with a spring trap or gate located in the side of the frame, normally outside of the line of the magazine, so that when said trap is forced laterally in the act of inserting the cartridge in the magazine said trap engages and retires the spring magazine-stop, substantially as described.

In testimony whereof I affix my signature in presence of two witnesses.

ANDREW BURGESS.

Witnesses:
PHILIP MAURO,
J. C. LATHROP.